Patented July 12, 1932

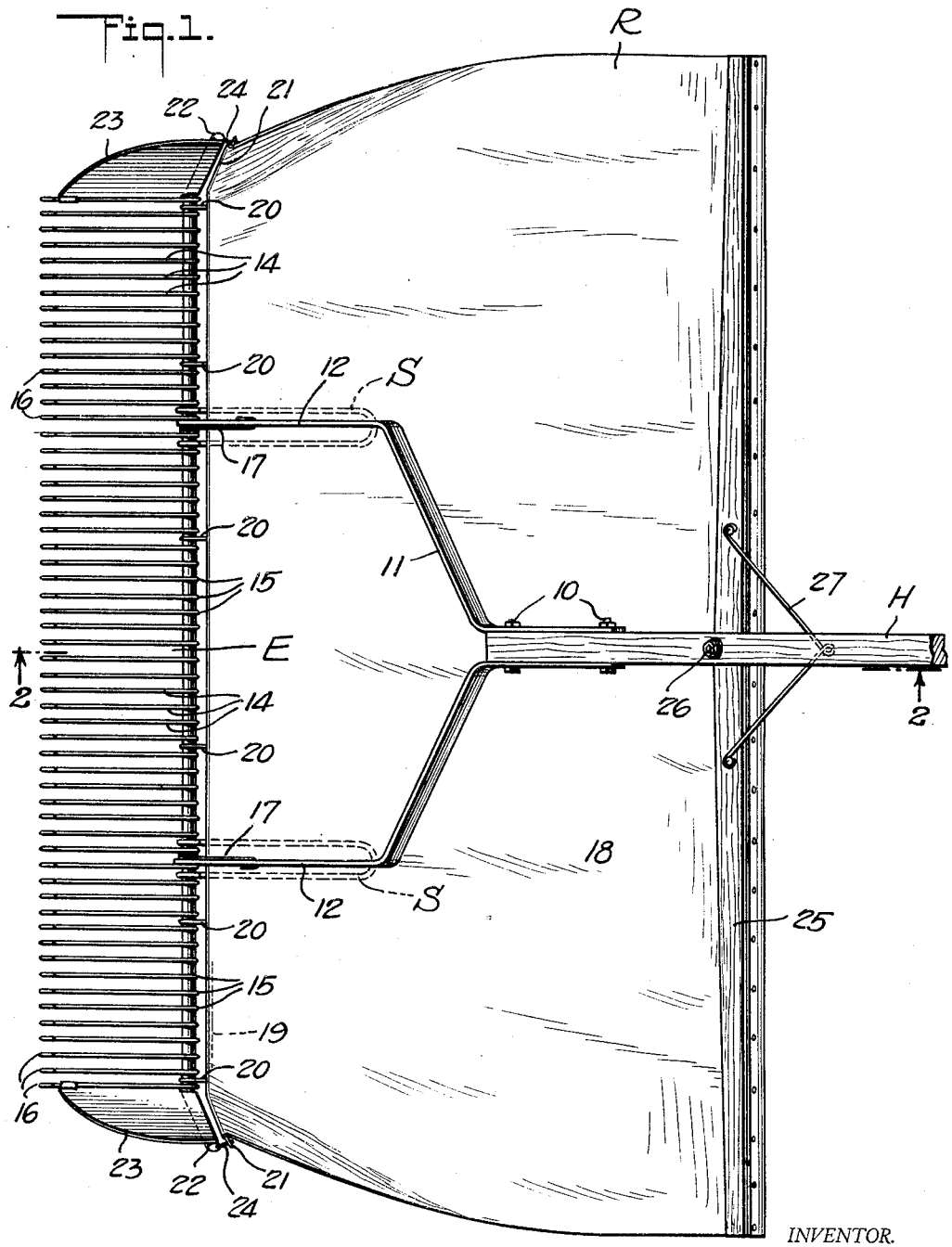

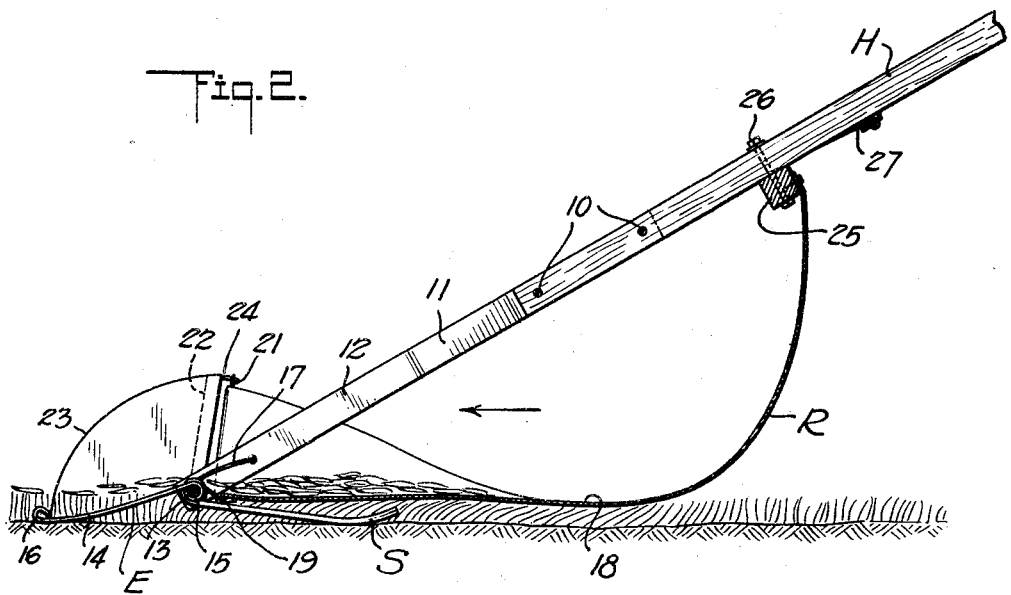
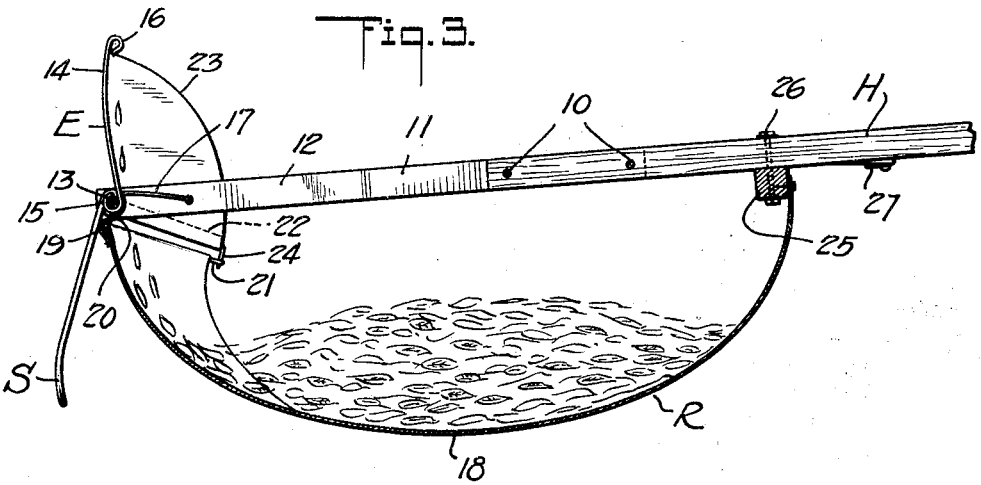

1,866,754

UNITED STATES PATENT OFFICE

HORACE R. CRANE, OF PASADENA, CALIFORNIA

RAKE

Application filed February 12, 1930. Serial No. 427,911.

My invention relates to and has for its purpose the provision of a rake, particularly adapted, although not necessarily for use in removing leaves and trash from the surface of lawns in such manner as to collect the leaves during the raking operation for carrying in and dumping from the rake as desired, all with but a minimum expenditure of manual effort and without any possibility of the rake causing damage to the lawn.

I will describe only one form of rake embodying my invention and will then point out the novel features thereof in claims.

In the accompanying drawings,

Figure 1 is a view showing in plan, one form of rake embodied in my invention;

Figure 2 is a vertical sectional view taken on the line 2—2 of Figure 1 and looking in the direction of the arrows, the rake being shown in raking position on a lawn, and Figure 3 is a view similar to Figure 2 and showing the position of the rake lifted clear of the lawn for the carrying of collected leaves.

Referring specifically to the drawings in which similar reference characters designate similar parts in each of the several views, my invention in its present embodiment comprises a handle H to the lower end of which is secured by bolts 10 a pair of members of strap metal co-operating to provide a yoke 11 having parallel and widely spaced arms 12 for supporting a raking element designated generally at E.

The raking element in the present instance comprises a rod 13 passing freely through openings in the free ends of the arms so as to be journaled in the latter for rocking movement. To the rod is secured at equally spaced intervals a multiplicity of tines 14 constructed of lengths of wire looped at one end about the rod as indicated at 15 and soldered or otherwise secured to the rod. The other and forward end of each tine 14 is curled vertically back upon itself as indicated at 16 to prevent the tines from catching in and tearing up the grass from the lawn as well as to prevent the tines from spearing the leaves and fouling the rake during the raking operation.

To the rod 13 is also secured a pair of skids S which project rearwardly from the rod or in the opposite direction therefrom as the tines, so as to rest upon the lawn in trailing relation to the tines as the rake is pushed over the lawn. The skids broadly constitute a means for maintaining the tines in a predetermined relationship to the surface of the lawn during the raking operation, irrespective of vertical rocking movement of the handle about the axis of the rod.

Springs 17 curled about the rod and secured at one end to the latter and at the other end to the arms 12, normally urge the raking element to the position shown in Figure 3 wherein the tines 14 assume a substantially vertical position to dump from the tines into a receptacle R any leaves remaining on the tines.

The receptacle R comprises a sheet 18 of fabric material such as canvas, reinforced and rendered rigid at its forward edge by a length of wire 19 over which the forward edge of the sheet is looped and then sewed. The forward edge of the sheet is secured by clips 20 to the rod 13, and the end portions of the wire 19 and the rod 13 are bent as indicated at 21 and 22 respectively so as to incline upwardly and outwardly for co-action with guard plates 23 secured to the endmost tines 14 and to the inclined extremities of the rod, which latter are secured by clips 24 to the inclined extremities of the wire 19.

The guard plates 23 confine against scattering from the tines, leaves accumulating on the latter as the rake is pushed over a lawn; and by the provision of the inclined extremities of the wire 19, the side edges of the receptacle at its forward end are caused to diverge upwardly and outwardly from each other to form side walls for confining leaves in the receptacle.

The rear edge of the sheet 18 is secured to a rigid bar 25, and the bar is rigidly secured by a bolt 26 and a suitable brace 27, to the handle H so that the receptacle will be suspended loosely beneath the handle in a sagging condition in trailing relation to the raking element to receive leaves accumulating on the tines during the raking operation.

The operation of the rake is as follows:

With the raking element E resting on the lawn to be cleaned, as shown in Figure 2, the skids S will maintain the tines 14 in a slightly downward and forward inclined position so that upon pushing the raking element over the lawn by means of the handle H, the tines will comb through the grass under any leaves or other trash in the path of the raking element. As the leaves accumulate on the tines, they are forced from the latter into the receptacle R during forward movement of the rake, and are thus collected.

When a sufficient quantity of leaves has collected in the receptacle, the rake is lifted clear of the lawn, upon which the springs 17 under their normal urging action, will be free to rock the rod 13 about its axis and dispose the tines in the substantially vertical position shown in Figure 3, thus causing any leaves remaining on the tines to gravitate therefrom and deposit into the receptacle.

When the rake is lifted clear of the lawn and held in a substantially horizontal position, the receptacle R forms a trough so that the collected leaves can be readily carried therein and then dumped therefrom as desired.

Although I have herein shown and described only one form of rake embodying my invention, it is to be understood that various changes and modifications may be made therein without departing from the spirit of the invention and the spirit and scope of the appended claims.

I claim:

1. A rake comprising a handle, a raking element having tines, a handle on which the raking element is pivotally mounted, means for maintaining the raking element in a position for its tines to comb through the grass of a lawn under leaves on the latter during movement of the raking element over the lawn irrespective of pivoting of the handle relative to the element, and means disposed in a position relative to the raking element to receive and collect leaves from the tines as the raking operation proceeds.

2. A rake comprising a handle, a raking element having tines and movably mounted on the handle, means engageable with the ground to maintain the raking element in a position for its tines to comb through the grass of a lawn under leaves on the latter during movement of the raking element over the lawn, means disposed in a position relative to the raking element to receive and collect the leaves from the tines as the raking operation proceeds, and means coacting with the raking element to move the latter to a position for dumping of leaves from the tines into the last means in response to raising of the rake sufficiently to clear the first means from the ground.

3. A rake comprising a handle, a raking element pivotally mounted on the handle, skids on the raking element engageable with the ground to maintain the element in a predetermined raking position with respect to the surface of a lawn, irrespective of movement of the handle about the pivotal mounting of the raking element, and means disposed in a position relative to the raking element to collect leaves gathered from the lawn by the raking element as the latter is moved over the lawn.

4. A rake comprising a handle, a raking element pivotally mounted on the handle, skids on the raking element engageable with the ground to maintain the element in a predetermined raking position with respect to the surface of a lawn, irrespective of movement of the handle about the pivotal mounting of the raking element, a receptacle disposed in a position relative to the raking element as to collect leaves gathered from the lawn by the raking element as the latter is moved over the lawn, and means for urging the raking element to a position for dumping of leaves therefrom into the receptacle.

5. A rake comprising a handle having a yoke, a raking element having a rod journaled in the yoke and provided with tines, skids secured to the rod and engageable with the ground to maintain the tines in a position to comb through the grass of a lawn under leaves on the latter during movement of the raking element over the lawn, a receptacle, and means for supporting the receptacle in a position to receive and collect leaves removed from the lawn by the tines.

6. A rake comprising a handle having a yoke, a raking element having a rod journaled in the yoke and provided with tines, skids secured to the rod and engageable with the ground to maintain the tines in a position to comb through the grass of a lawn under leaves on the latter during movement of the raking element over the lawn, a receptacle, means for supporting the receptacle in a position to receive and collect leaves removed from the lawn by the tines, the end portions of the rod projecting upwardly therefrom, and guard plates secured to said end portions of the rod for confining leaves on the tines.

7. A rake comprising a handle having a yoke, a raking element having a rod journaled in the yoke and provided with tines, skids secured to the rod and engageable with the ground to maintain the tines in a position to comb through the grass of a lawn under leaves on the latter during movement of the raking element over the lawn, a flexible receptacle, and means for supporting the receptacle from the handle and the rod in a position to receive leaves from the tines as the raking element is moved over the lawn.

8. A rake comprising a handle having a yoke, a raking element having a rod journaled in the yoke and provided with tines, skids secured to the rod and engageable with the ground to maintain the tines in a position to comb through the grass of a lawn under leaves on the latter during movement of the raking element over the lawn, a flexible receptacle, means for supporting the receptacle from the handle and the rod in a position to receive leaves from the tines as the raking element is moved over the lawn, and means for urging the raking element to a position for dumping of leaves from the tines into the receptacle.

9. A rake comprising a raking element having tines, means by which the element can be moved over a lawn, means fixed relative to the raking element engageable with the ground to maintain the raking element in a position for its tines to comb through the grass of the lawn under leaves on the latter during movement of the raking element over the lawn, and means for receiving the leaves from the tines as the raking operation proceeds.

10. A rake comprising a raking element having tines, means to which said element is pivotally connected and by which the element can be moved over a lawn, skids fixed relatively to the element in trailing relation thereto and engageable with the ground to maintain the element in a position for its tines to comb through the grass of the lawn under leaves on the latter, and a receptacle for receiving the leaves from the tines as the raking operation proceeds.

11. A rake comprising a raking element, means by which the element can be moved over a lawn, a receptacle disposed in trailing relation to said element to receive leaves raked from the lawn as the element traverses the latter, means for urging the element to a dumping position with respect to the receptacle, and means engageable with the ground to maintain the raking element in raking position against the action of the urging means.

HORACE R. CRANE.